(12) United States Patent
Oron et al.

(10) Patent No.: US 7,099,552 B1
(45) Date of Patent: Aug. 29, 2006

(54) OPTICAL TERMINATOR

(75) Inventors: Ram Oron, Rehovot (IL); Ariela Donval, Ramat Gan (IL); Anatoly Patlakh, Holon (IL); Sharon Goldstein, Tel Aviv (IL); Moshe Oron, Rehovot (IL)

(73) Assignee: KiloLambda Technologies Ltd., Tel-Aviv (IL)

( * ) Notice: Subject to any disclaimer, the term of this patent is extended or adjusted under 35 U.S.C. 154(b) by 0 days.

(21) Appl. No.: 10/686,126

(22) Filed: Oct. 15, 2003

Related U.S. Application Data

(60) Provisional application No. 60/448,023, filed on Feb. 18, 2003.

(51) Int. Cl.
*G02B 6/00* (2006.01)
(52) U.S. Cl. ...................................... 385/139
(58) Field of Classification Search ............ 385/27–28, 385/31, 76–78, 88–89, 92, 94, 96–99, 123–128
See application file for complete search history.

(56) References Cited

U.S. PATENT DOCUMENTS

2003/0063884 A1* 4/2003 Smith et al. ................. 385/129

FOREIGN PATENT DOCUMENTS

| EP | 0598523 B1 | | 3/1999 |
|---|---|---|---|
| JP | 2000 214316 | * | 8/2000 |

* cited by examiner

*Primary Examiner*—Javaid H. Nasri
(74) *Attorney, Agent, or Firm*—Jenkens & Gilchrist

(57) ABSTRACT

The disclosure relates to an optical terminator device suitable for terminating high energy optical signals. The device includes a heat sink cap having an internal surface. An optical absorbing layer is positioned on the internal surface of the heat sink cap. A scattering core having a fiber or waveguide connection is positioned within the heat sink cap such that a thermal barrier is maintained between the optical absorbing layer and the scattering core.

28 Claims, 17 Drawing Sheets

Fig. 12 Terminator experimental performance, ORL-Optical reflection loss as function of wavelength.
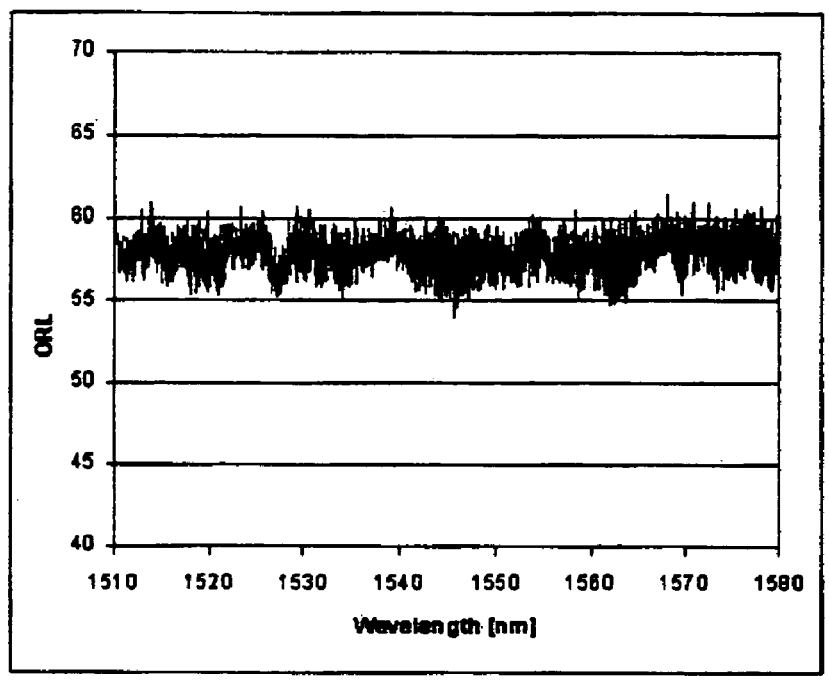

OPTICAL TERMINATOR

PRIORITY CLAIM AND CROSS REFERENCE

The present application claims priority from co-pending United States Provisional Application for Patent Ser. No. 60/448,023, filed Feb. 18, 2003, the disclosure of which is hereby incorporated by reference.

FIELD OF THE INVENTION

The present invention relates generally to optical terminator devices used for fiber optics or optical waveguides. The present invention further relates to methods of producing such optical terminator devices. In addition, the present invention more particularly relates to optical terminator devices which are useful in terminating both low and high power optical signals. Still more particularly, the present invention relates to the use of small volume scattering media along with large area and volume absorbing optical media in an optical terminator application.

BACKGROUND OF THE INVENTION

It is not unusual for optical systems (such as fiber lasers, fiber optic communications, and medical, industrial and remote sensing applications which utilize light delivery means) to handle high optical power signals. For example, it is common for such systems to utilize optical signals in a single fiber or waveguide having optical signal power of up to several Watts. These fibers and waveguides support a large variety of operating modes, for example, single-mode, multi-mode and polarization maintaining mode.

These optical systems suffer from noise which is commonly caused by optical reflections resulting from discontinuities. As an example, the end of an optical fiber may cause an optical signal to reflect and travel back towards the source. This reflected signal may interfere with the source operation. Additionally, the generated noise may limit the ability of system components to detect transmitted signals. It is known in the art to control reflection through the use of optical terminators which possess low reflection characteristics. These optical terminators typically utilize thin film coatings, optical absorbing polymers and adhesives, and optical black coatings. However, when the specific intensity or power per unit area of the terminated optical signal is relatively high, these prior art terminators are exposed to light fluxes beyond their damage thresholds and eventually fail. A need accordingly exists for an optical terminator that is capable of terminating or dumping optical signals having high intensities or powers. There would be an advantage if such an optical terminator could be placed at the end of the fiber line or integrated within an optical device.

It is further recognized that many optical systems are being designed to carry optical signals over a relatively broad spectral range. Unfortunately, many prior art optical terminators, in addition to being limited in terms of power, are further restricted to providing effective termination to a limited range of wavelengths. There is accordingly a need for an optical terminator that is capable of terminating a wide range of wavelengths (for example, from the visible at about 400 nm to the infared at about 2000 nm).

It is further recognized that transmitted optical signals can utilize any one of a number of selected transverse modes. The variety of mode choices include, for example, single-mode of various numerical apertures, multi-modes of various numerical apertures and polarization maintaining waveguides of various geometries. It would be an advantage if the optical terminator were configured to be capable of terminating a wide range of numerical apertures and mode structures.

There exist a number of known ways for realizing an optical terminator.

In accordance with one method, one or more highly absorbing materials are attached to the end of a fiber or a waveguide thus creating a spot of high temperature at the point of optical signal impingement. This solution puts the maximal limit of operation at the damage threshold of the chosen absorbing material. The damage threshold is limited since heat transfer times are slow, and in many cases not sufficiently fast to cool down the hot spot before damage, like melting or phase change, occurs to the absorbing media.

In another method, a higher power optical terminator is realized by using long volume absorbers in the core (for example, core absorbing fibers ATN-FB by CorActive Inc. Quebec, Canada). This solution is relatively expensive, and undesirably leaves the heat in the core volume which is generally small compared to the clad and cover cap volume. Additionally, these fibers usually can perform an absorbing function within a limited wavelength region.

Yet another method performs the absorbing function in a tight clad coated with polymer. Here, the core is non-absorbing core, with absorption occurring in a tight clad coated with polymer solutions. Undesirably, the core can nonetheless become heated by heat conduction from the absorbing tight clad, thus limiting the useful power range of the terminator to low powers. This solution requires a very precise matching of the core indexes (so as to prevent back reflection at the interface). Matching in this manner is a difficult task at a wide range of temperatures of operation since different materials used possess different dn/dT values (index change with temperature).

In summary, optical terminators which are better at handling higher power signals without damage, are capable of handling wider spectral ranges and further support many mode structures simultaneously, are needed. The present invention addresses these and other needs in the art.

SUMMARY OF THE INVENTION

In accordance with an embodiment of the present invention, an optical terminating device comprises a light transmitting medium having an input end leading to a scattering core and an absorbing area heat sink, terminating scattered light, which is thermally insulated from the core area.

In accordance with another embodiment of the present invention, an optical terminating device comprises a light transmitting medium having an input end leading to a scattering outer clad, or an enlarged core, and an absorbing area heat sink, terminating scattered light, which is thermally insulated from the core area.

More generally speaking, the present invention involves scattering received light (either away from the inner parts of a core or away from an outer part of an enlarged core), and then absorbing the scattered light in a thermally insulated heat sinking area.

Embodiments of the present invention possess a number of advantages in comparison to prior art optical terminator designs. The optical terminators of the present invention are broadband in operation and thus can be applied to all light bands of the communication needs (for example, at regions of 0.8, 1.3, 1.5 micrometers), and can serve as a terminator to a multitude of different light sources at the same time. The optical terminators of the present invention possess a very high damage threshold and can withstand high input powers for long periods of time. The optical terminators of the present invention dissipate power in a large area and volume heat sink which is isolated thermally from the light transmitting fiber, thus enabling the device to withstand high average powers. The optical terminators of the present invention can be applied to single-mode, multi-mode and polarization maintaining fibers as well as waveguides having similar properties. Some designs for the optical terminators of the present invention are capable of terminating all the mode structures in a single terminator unit. Certain embodiments of the optical terminator of the present invention have a scattering core manufactured based on a "fiber fuse" phenomenon, and thus can be advantageously manufactured in the optical waveguide or fiber using external laser light. Certain embodiments of the optical terminator of the present invention have a scattering core manufactured based on filled capillaries including scattering bubbles wherein the filler material is advantageously solidified using heat or UV (ultra-violet) radiation in either external or in situ positions.

BRIEF DESCRIPTION OF THE DRAWINGS

A more complete understanding of the invention and its advantages will become apparent upon reading the following detailed description in conjunction with the following drawings wherein:

FIG. 12 is a graph illustrating the performance of the scattering core terminator at a large spectral band and at high power;

DETAILED DESCRIPTION OF THE DRAWINGS

Figure 1:
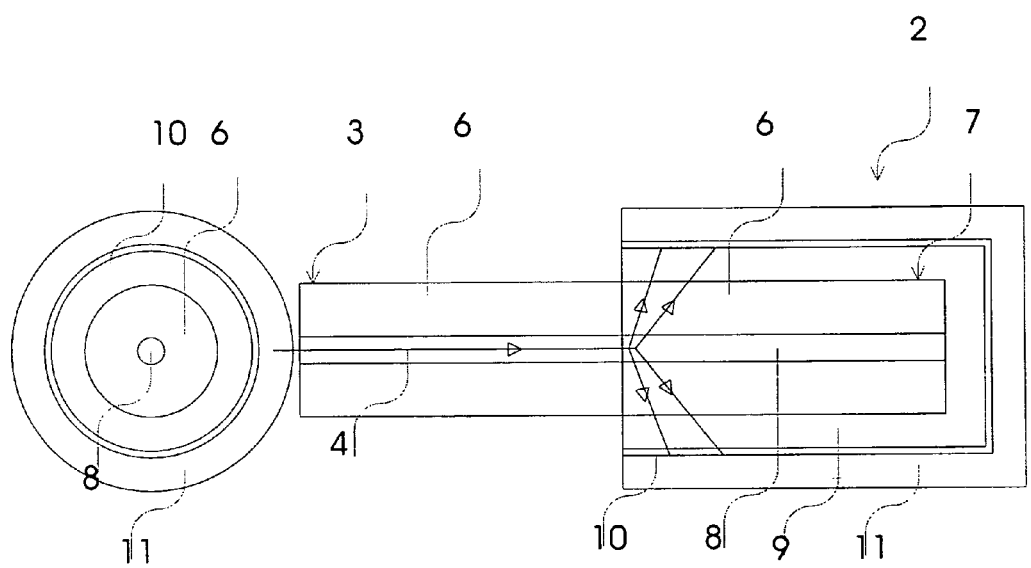
FIGS. 1a and 1b are lateral and longitudinal, respectively, cross-sectional schematic views of an optical terminator on a fiber.

Reference is now made to FIGS. 1a and 1b wherein there are shown lateral and longitudinal, respectively, cross-sectional schematic views of an optical terminator 2 on a fiber 3. The fiber 3 includes a light conducting core 4 and a cladding 6. The fiber 3 may, for example, comprise a single mode silica SMF 28 fiber. Light (indicated by an arrow path) propagates through the core 4 of the fiber 3. Within the terminator 2 is affixed an optical fiber 7 having similar dimensions to the non-terminator fiber 3. The fiber 7 within the terminator 2, however, has a scattering core 8 as opposed to a light conducting core 4. Any suitable scattering fiber may be used within the terminator 2. The scattering core 8 of the fiber 7 may be produced using any selected one of a number of techniques. For example, the scattering core 8 may be produced by a "fiber fuse" method as described herein (see, also, FIGS. 7 and 8). Alternatively, the scattering core 8 may be produced using a filled capillary method as described herein (see, also, FIG. 10). Still further, the scattering core 8 may comprise a scattering enlarged core as described herein (see, also, FIGS. 11, 13, 16 and 17). Light, again represented by arrow paths, is scattered by the scattering core 8, and propagates through the silica cladding 6 (and a surrounding air barrier 9) into an absorber area layer 10 of the terminator 2. The absorber layer 10 is configured to substantially surround the silica cladding 6 and cover the entire internal area of a heat sink cap 11 which provides an enclosure for the terminator 2. The absorber layer 10 functions to, absorb the scattered light from the scattering core 8 over a much larger area (between about 1,000 and 10,000 times) than the core 8 cross-section. This significantly larger area of absorption provided by the absorber layer 10 allows for better heat conduction outwards and the air barrier 9 maintains the thermally insulated core 8 at temperatures which are below its damage or melting temperature. The absorber layer 10 may be made of any suitable material which allows for wide range of wavelengths to be absorbed, and in particular may comprise an optical black paint or epoxy paint.

Figures 2A, 2B:
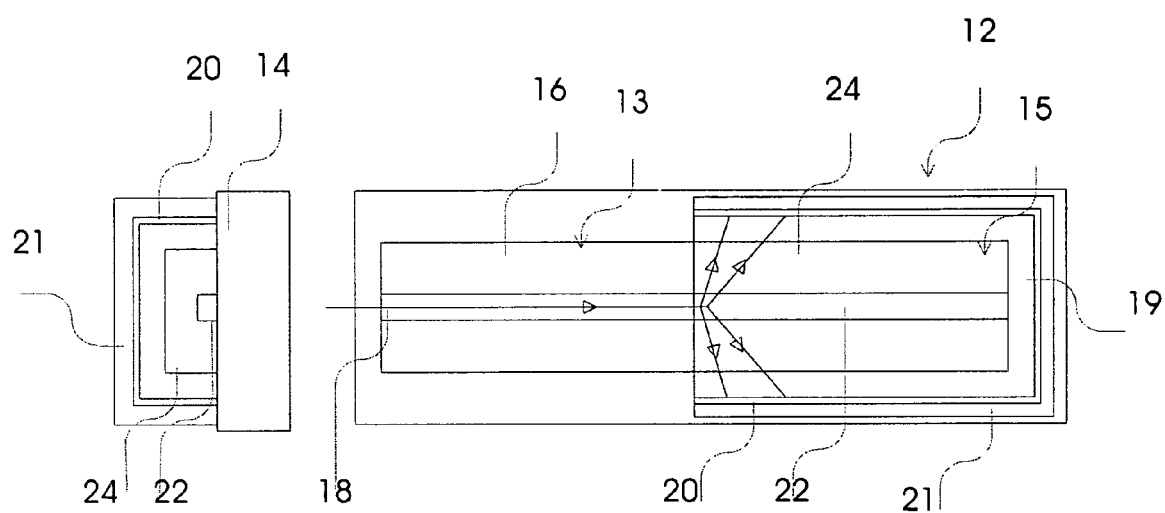
FIGS. 2a and 2b are lateral and longitudinal, respectively, cross-sectional schematic views of an optical terminator in a waveguide.

Reference is now made to FIGS. 2a and 2b, wherein there are shown lateral and longitudinal, respectively, cross-sectional schematic views of an optical terminator 12 in a waveguide 13. The terminator 12 is similar in configuration and operation to the terminator 2 of FIGS. 1a and 1b, with the exception that the terminator 12 is built on the waveguide 13. The waveguide 13 propagates light (indicated by an arrow path) within a guide core 18 having dimensions of few microns by few microns (for example, 10×10 microns) which is built on a substrate 14 and covered by a cladding 16. The cladding 16 may comprise, for example, spin on glass (SOG). Within the terminator 12 is a waveguide 15 having similar dimensions to the waveguide 13. The waveguide 15 within the terminator 12, however, has a scattering guide core 22 as opposed to a light conducting core 18. Any suitable scattering fiber may be used within the terminator 12. The scattering core 22 of the waveguide 15 may be produced using any selected one of a number of techniques. For example, the scattering core 22 may be produced by a "fiber fuse" method as described herein (see, also, FIGS. 7 and 8). Alternatively, the scattering core 22 may be produced using a filled capillary method as described herein (see, also, FIG. 10). Still further, the scattering core 22 may comprise a scattering enlarged core as described herein (see, also, FIGS. 11, 13, 16 and 17). Light, again represented by arrow paths, is scattered by the scattering core 22, and propagates through the cladding 24 (and a surrounding air barrier 19) into an absorber layer 20 of the terminator 12. The absorber layer 20 is configured to substantially surround the cladding 24 and cover the entire internal area of a heat sink cap 21 which provides an enclosure for the terminator 12. The absorber layer 20 functions to absorb the scattered light from the scattering core 22 over a much larger area (between about 1,000 and 10,000 times) than the core 22 cross-section. This significantly larger area of absorption provided by the absorber layer 20 allows for better heat conduction outwards and the air barrier 19 maintains the thermally insulated core 22 at temperatures which are below its damage or melting temperature. The absorber layer 20 may be made of any suitable material which allows for wide range of wavelengths to be absorbed, and in particular may comprise an optical black paint or epoxy paint.

Figure 3:
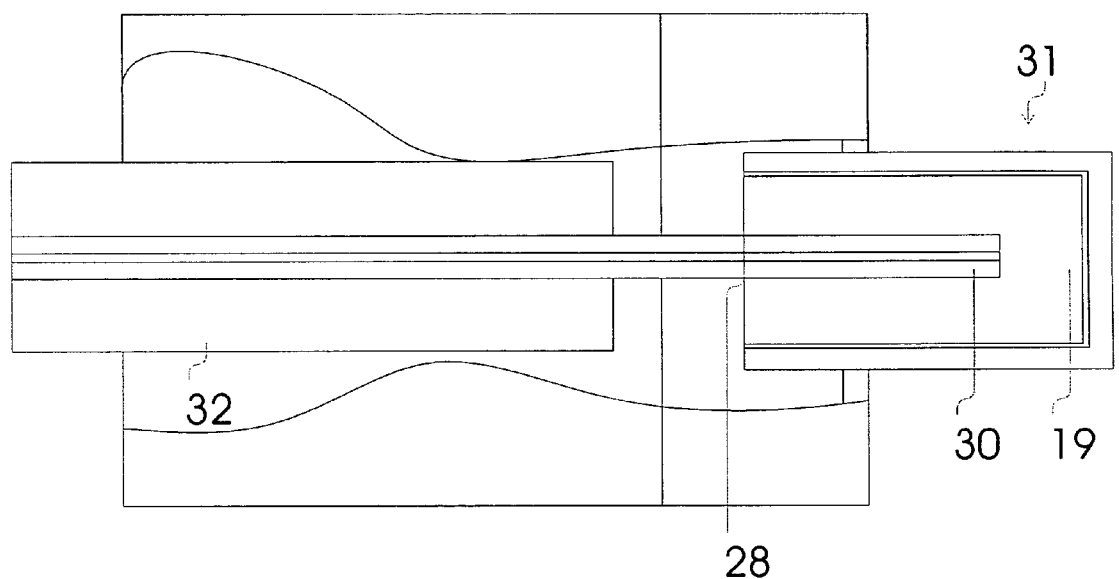
FIG. 3 is a cross-sectional view of a package for the terminator in a connector-like assembly.

Reference is now made to FIG. 3, wherein there is shown a cross-sectional view of a package for the terminator in a connector-like assembly. A ferrule 32 contains an insertion part of the terminator which may comprise, for example, a SMF 28 fiber or a high numerical aperture HNA fiber. This is connected optically (for example, by fusion splicing 28) to a fiber 30 within the terminator which functions as a scatter. An absorber cap 31 surrounds the fiber 30. The cap 31 may comprise a terminator of the type described above and illustrated in FIGS. 1a, 1b, 2a and 2b. Again, the fiber 30 may be produced by using "fiber fuse" process, the "filled capillary" process or the scattering enlarged core process.

Figure 14:
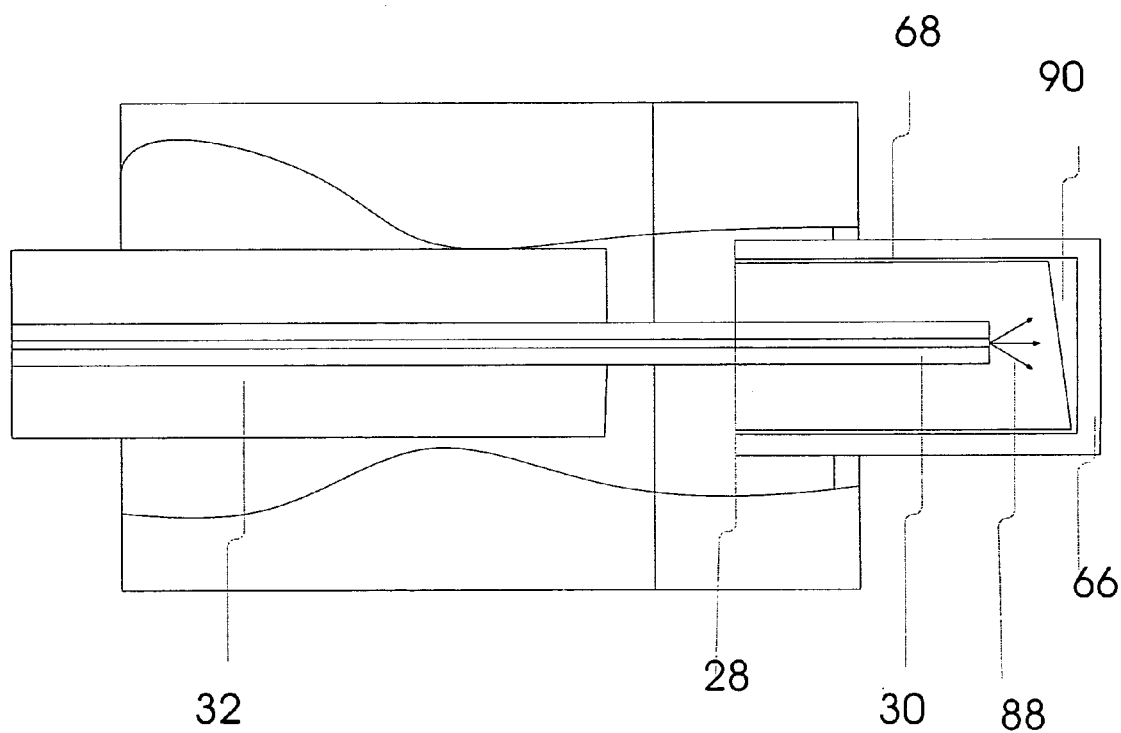
FIG. 14 is a cross-sectional view of a package for the terminator in a connector-like assembly which utilizes an angled absorber cap.

An alternative embodiment for the terminator of FIG. 3 is shown in FIG. 14. The terminator in this instance includes an angled absorber cap 66 surrounding the fiber 30. In this instance, the fiber 30 preferably, but need not necessarily, comprises a scatterer. Light 88 exiting from the fiber 30 impinges on the angled absorbing cap 66, more specifically on an angled insert 90 portion thereof. The inner surface of the cap 66, including the angled insert 90, is covered with absorber layer 68 (like the layer 10/20 described above). The angled insert 90 may possess an angles of about 4–10 degrees. This angle assists is minimizing mirror-like reflections of the light 88 from the absorber layer 68 (which exist in every absorber to a certain extent) from re-entering the central (scattering) fiber 30. This serves to additionally reduce the amount of light that is back reflected through ferrule and fiber 32.

Figure 15:
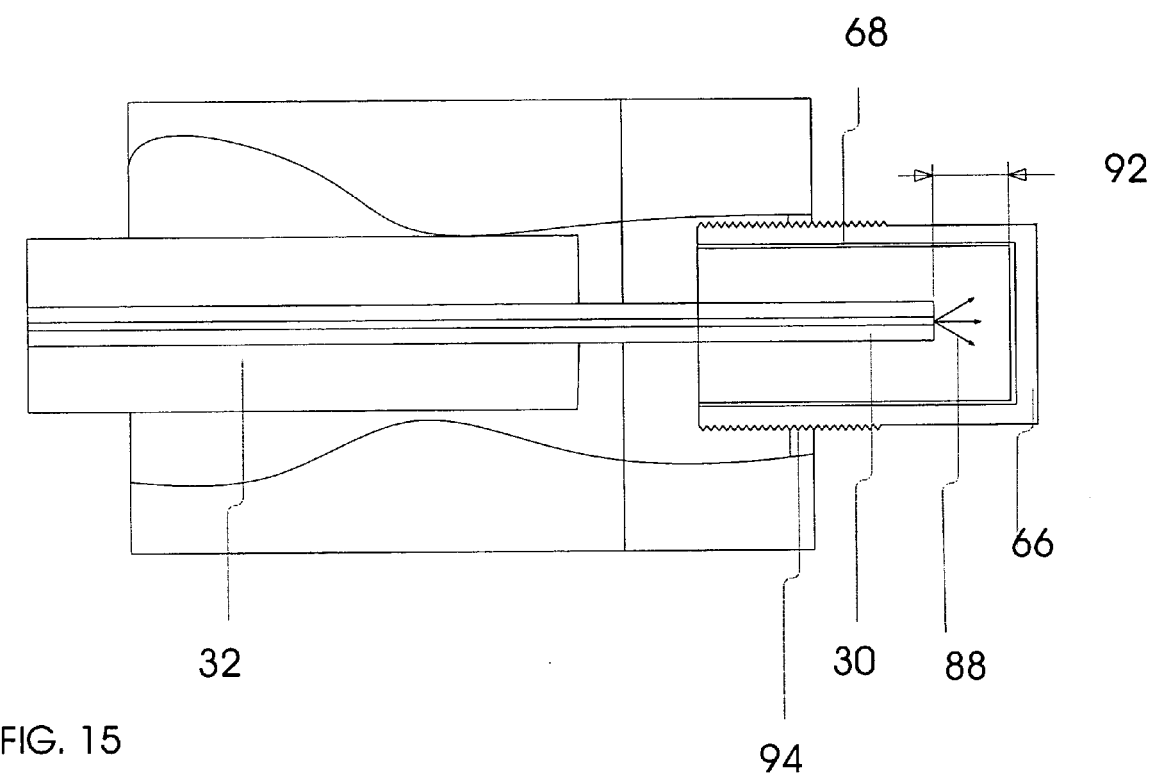
FIG. 15 is a cross-sectional view of a package for the terminator in a connector-like assembly which utilizes a variable reflectance terminator.

A further alternative embodiment of the terminator of FIG. 3 is shown in FIG. 15. The terminator in this instance includes a variable reflectance cap 66 surrounding the fiber 30. In this instance, the fiber 30 preferably, but need not necessarily, comprises a scatterer. The absorbing cap 66 is threaded 94 such that its axial position with respect to the fiber 30 can be changed. More specifically, by rotating the cap 66, a distance between the end of the cap and an end of the fiber 30 changes. When the distance is too short, some scattered light from the absorber layer 68 (like layer 10/20 described above) may re-enter the fiber 30 thus giving rise to a small amount of back reflection into the system through fiber and ferrule 32. Controlling the distance through clockwise or counter-clockwise rotation of the cap 66 allows for precise control to be exercised over reflection characteristics.

Figure 16:
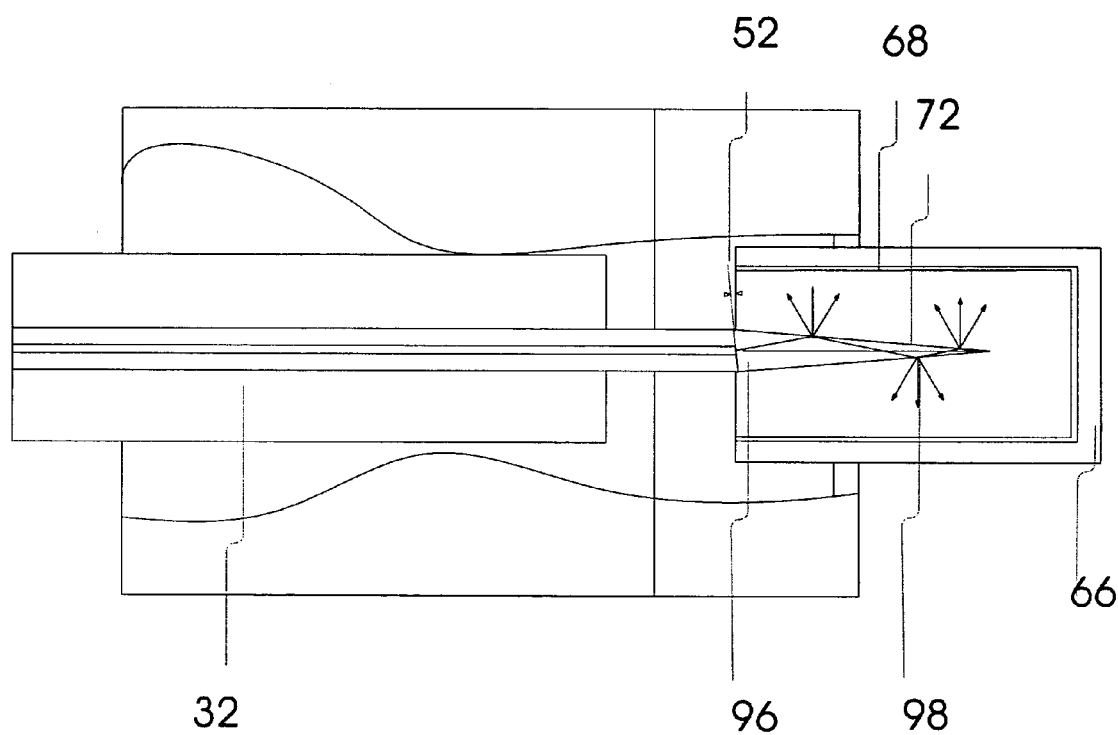
FIG. 16 is a cross-sectional view of a package for the terminator in a connector-like assembly which utilizes a scattering conic core terminator.

Yet another alternative embodiment of the terminator of FIG. 3 is shown in FIG. 16. In this embodiment, the terminator includes a conic enlarged scattering core 96. The connecting fiber is preferably cut at an angle 52 (for example, of about 4–10 degrees) and then spliced or glued to a transparent conic volume which comprise the core 96. The volume has a scattering external surface 72. The core 96 volume can be viewed as an enlarged or extended core which has a cone base with dimensions similar to that of the fiber clad in diameter and a length of about 5–10 mm. The angle splicing allows for a wide selection of materials, not being confined to materials with matching indexes of refraction to the fiber. Light entering the core 96 is not confined within the conic volume 96. This light spreads to the outer surface 72 where it is partially scattered 98 at each instance where it hits the external surface. Light leaving the conic scattering core is absorbed by the absorbing layer 68 (like layer 10/20 as described above) on the inside surface of the cap 66.

It is recognized that the external surface of an extended core 96 regularly looses light by scattering due to surface irregularities. Etching, mechanical sanding or sand blasting can create the scattering surface on, for example, glass or glass-like materials of the extended core. Maintaining a large index of refraction difference ($\Delta n$) at the scattering surface enhances the scattering ability of the surface proportionally to ($\Delta n$). In the preferred embodiment, $\Delta n$ is a relatively large value of about 0.5 (the difference between glass and air which surrounds the volume). The conic shape further advantageously enlarges the number of times the light hits the scattering surface, thus enabling more efficient scattering to occur.

Figure 17:
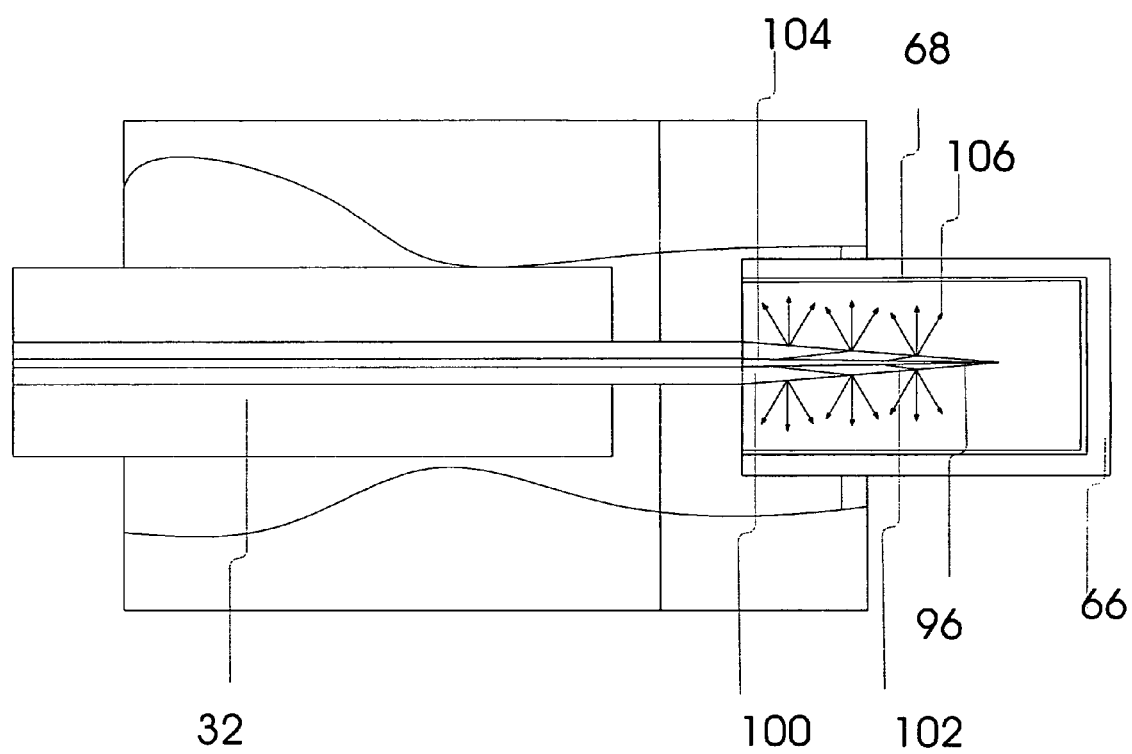
FIG. 17 is a cross-sectional view of a package for the terminator in a connector-like assembly which utilizes a scattering conic core terminator.

An alternative embodiment of the terminator of FIG. 16 is shown in FIG. 17. In this embodiment, the conic scattering core 96 is prepared using a method wherein the fiber is pulled when hot to create a transparent extended conic volume 100 having a diminishing size core 104. This smaller size core cannot transmit the light mode which enters into it and instead scatters the light out into the clad 102. Light, which is not being confined at core 104, spreads to the outer surface of clad 102 where it is partially scattered 106 at each instance where it hits the external surface of the clad. This additional volume has a cone base dimension similar to the core in diameter and length of about 5–10 mm. Light leaving the clad 102 of the conic extended scattering core 96 is absorbed by the absorbing layer 68 (like layer 10/20 as described above) on the inside surface of the cap 66.

Again, it is recognized that the external surface of an extended core 96 regularly looses light by scattering due to surface irregularities. Etching, mechanical sanding or sand blasting can create the scattering surface on, for example, glass or glass-like materials of the extended core. Maintaining a large index of refraction difference ($\Delta n$) at the scattering surface enhances the scattering ability of the surface proportionally to ($\Delta n$). In the preferred embodiment, $\Delta n$ is a relatively large value of about 0.5 (the difference between glass and air which surrounds the volume). The conic shape further advantageously enlarges the number of times the light hits the scattering surface, thus enabling more efficient scattering to occur.

Figure 4:
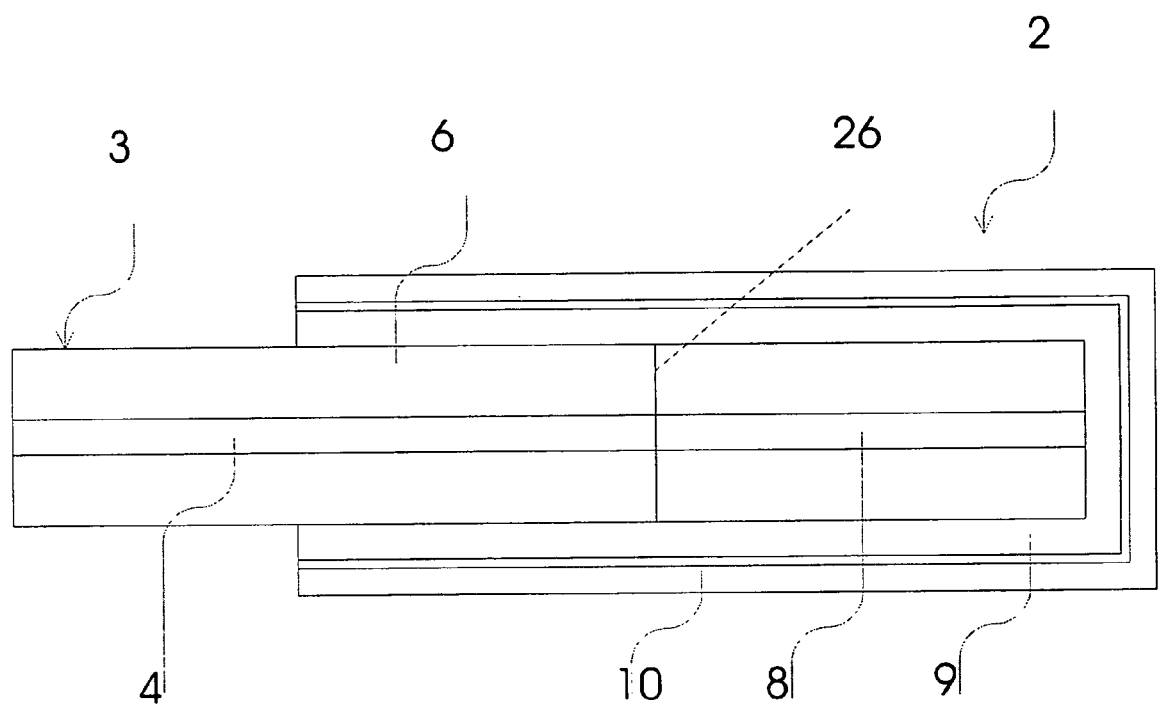
FIG. 4 is a cross-sectional view of a package for the terminator in a bare fiber assembly.

With reference now to FIG. 4, a cross-sectional view is presented of a package for the terminator 2 in a bare fiber assembly. Here, the light impinging from core 4 on scattering core 8 is scattered (passing through thermal air barrier 9) and absorbed in the absorber layer 10 of a heat sink cap that covers the whole assembly. In this configuration the fibers having cores 4 and 8 are fusion spliced together at plane 26 which is located within the area of the heat sink cap.

Figure 5:
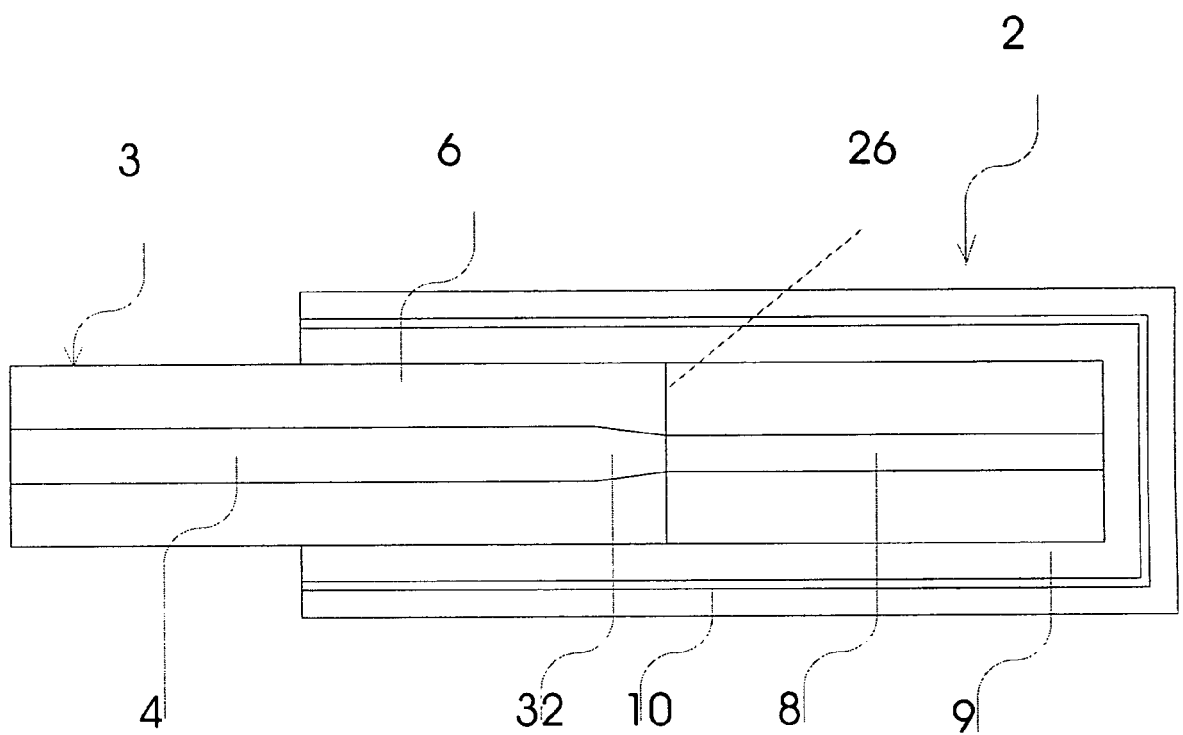
FIG. 5 is a cross-sectional view of a package for the terminator in a bare fiber assembly, where two different core diameters are used.

In FIG. 5, a cross-sectional view is presented of a package for the terminator 2 in a bare fiber assembly, where two different core diameters are used. Here, the light impinging from core 4 on scattering core 8 is scattered and absorbed in the absorber layer 10 of the heat sink that covers the whole assembly. In this configuration, the core 4 is larger in diameter than scattering core 8 (for example, an SMA fiber for core 4 with an HNA fiber for core 8). In a preferred implementation, the "fiber fuse" manufacturing method is utilized because it is simpler and resembles the geometry described in FIG. 7. The cores 4 and 8 are fusion spliced together at 26 to produce a funnel region 32 in the diameter transition between the cores. This geometry works also with normal fusion splicing of the input fiber having core 4 with a pre-processed (for example, by the "fiber fuse" method or the filled capillary method) fiber having core 8. As discussed above, an air barrier 9 is provided for thermally insulating the cores 4/8 from heat dissipated in the layer 10 of the heat sink cap.

Figure 6:
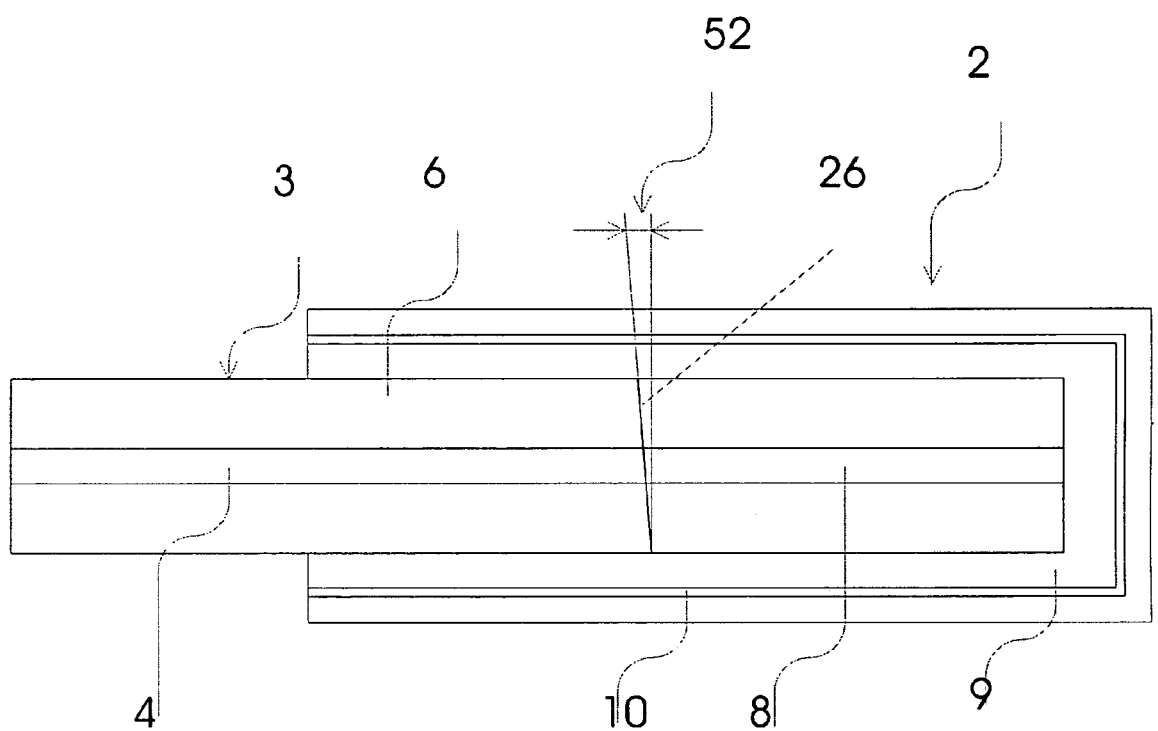
FIG. 6 is a cross-sectional view of a package for the terminator in a bare fiber assembly having angled spliced faces.

With reference to FIG. 6, there is shown a cross-sectional view of a package for the terminator 2 in a bare fiber assembly having angled spliced faces. Here, the light impinging from core 4 on scattering core 8 is scattered (passing through an air barrier 9) and absorbed in the absorber layer 10 of the heat sink that covers the whole assembly. In this configuration the fibers having cores 4 and 8 are fusion spliced 26 together in an angled connection having an angle 52 (which, for example, may be chosen as about 8 degrees). This angled splice tends to eliminating back reflection from surface at the fusion splice 26 of the impinging radiation into core 4.

Figure 7:
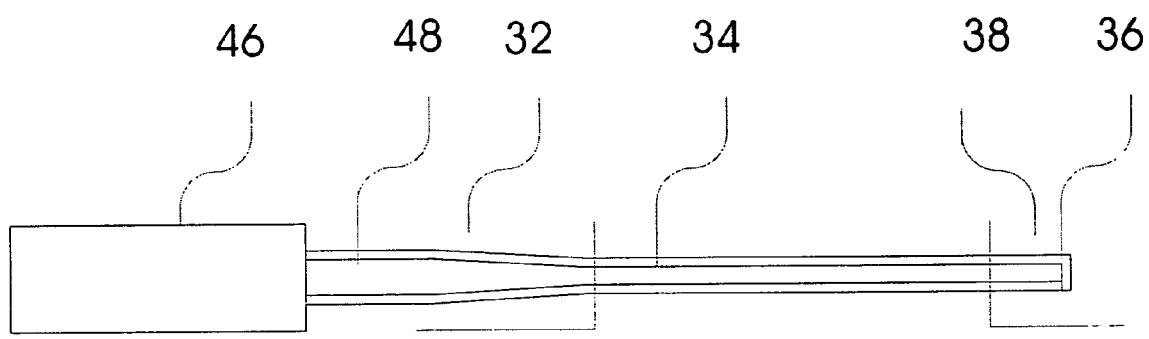
FIG. 7 illustrates a set up used to prepare the scattering core using the "fiber fuse" method (with a funnel)

Reference is now made to FIG. 7 wherein there is shown a set up used to prepare the scattering core using the "fiber fuse" method. A high-energy laser 46 (for example, providing 30–35 dBm CW power) emits light which is fed into a large core fiber/waveguide 48. The power per unit area of this light is lower than a "fiber fuse" threshold. The laser power flows in the fiber/waveguide 48 toward a narrowing funnel box 32. The funnel box is sized and shaped to fit the core size of a fiber/waveguide 34. On its way forward, the light impinges into end box 38 where a contaminating deposition 36 creates a "fiber fuse" backward (toward the laser 46). This effect damages the fiber/waveguide 34 to include bubbles along its core up to the location of the funnel 32 where the damage stops since the area is larger and the power per unit area is lower than needed for "fiber fuse" to occur/continue. The fiber 34 may then be utilized as the scattering core of the optical terminator.

Figure 8:
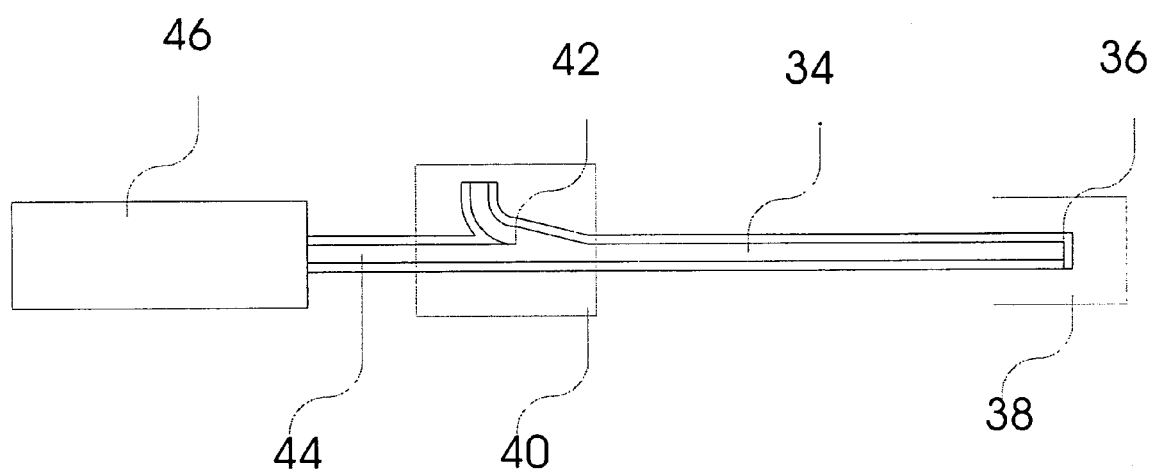
FIG. 8 illustrates a set up used to prepare the scattering core using the "fiber fuse" method (with a splitter)

FIG. 8 describes a fiber fuse method similar to that of FIG. 7. Again, a high-energy laser 46 (for example, providing 30–35 dBm CW power) emits light which is fed into regular core fiber/waveguide 44. The laser power flows in the fiber/waveguide 44 toward an energy splitter 42 and continues to propagate in fiber/waveguide 34. On its way forward the light impinges into end box 38, where a contaminating deposition 36 creates a "fiber fuse" backward (toward the laser 46). This effect damages the fiber/waveguide 34 to include bubbles along its core up to the location of the splitter 42 where the damage stops since the split increases the area (by bleeding off energy) and the power per unit area is lower than needed for the "fiber fuse" to continue. The fiber 34 may then be utilized as the scattering core of the optical terminator.

It will be noted that these fiber fuse processes can be performed externally on a dedicated set up, with the scattering core then being fitted into its place within the terminator. Alternatively, the processes can be performed internally (in situ) on the finished product.

The "fiber fuse" is a phenomenon that results in the destruction of an optical fiber core creating a string of highly scattering empty bubbles in the core. This "fiber fuse" effect has been observed at laser powers on the order of $3\times10^6$ watts/cm$^2$ in the core. The "fiber fuse" effect is characterized by the propagation of a bright visible light from the point of initiation toward the laser source. The term "fiber fuse" has been adopted to refer to the phenomenon because of the similarity in appearance to a burning fuse. The fiber fuse has been shown to occur when the end of the fiber is contaminated, and it has also been initiated spontaneously from splices and in-core fiber gratings. Examination of the fiber core after the "fiber fuse" effect occurs reveals extensive damage. The silica core is melted and refused, and bubbles are formed throughout its length. The damaged regions, or bubbles, observed in the core after "fiber fuse" propagation, have been the subject of a number of investigations. Atomic force microscope tests show that the bubbles are hollow, indicating vaporization of the silica. The structure of the bubbles is in many cases a periodic structure. The "fiber fuse" phenomenon is used here to create scattering, or change of direction of the impinging light by the bubbles, thus creating an angularly spread light source at the terminator that does not reflect the light back into the input fiber. Instead, scattered light passes into and through the cladding.

Study of this effect by the inventors indicates that the "fiber fuse" effect is readily initiated in most fibers. It appears as a brilliant white visible spot that propagates from the point of initiation at the fiber end towards the laser source. The spectrum of the light emitted from the fuse corresponds approximately to a temperature of 5400° K, indicating that the "fiber fuse" may consist of plasma. The speed of the "fiber fuse" propagation is about 1 meter per second in most fibers. The "fiber fuse" can travel through many meters of fiber. The fiber gets non-transparent and scattering thus serving as a good scatterer for high power terminators.

The high-energy laser light (for example, providing 30–35 dBm CW power at 1550 nm wavelength) is fed into large core fiber/waveguide, where its power per unit area is lower than the "fiber fuse" threshold. The laser power flows in the fiber toward a narrowing funnel where its size is fit to a smaller core size of fiber/waveguide. A contaminating deposition at the end of this fiber creates a "fiber fuse" effect travelling backward (toward the laser) and damaging the fiber/waveguide up to the funnel. At this point, it stops since the area gets larger and the power per unit area is lower than needed for the "fiber fuse" effect to continue. The damaged fiber the "fiber fuse" is then a processed scatterer, having bubbles along its core.

Figure 9:
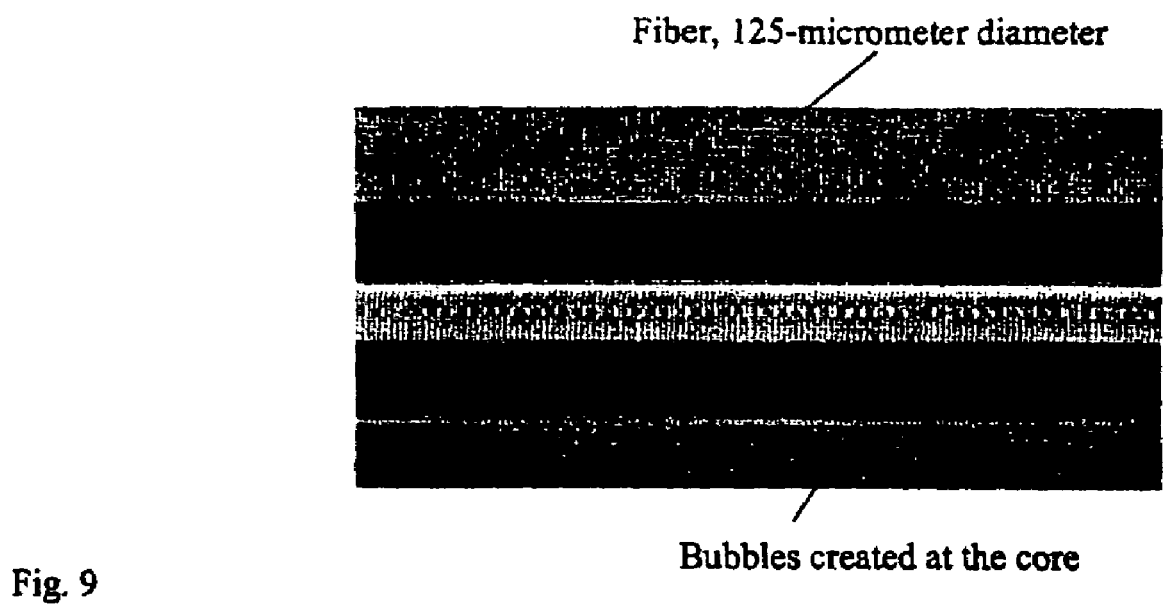
FIG. 9 is a photographic picture of a fiber possessing a scattering core formed/produced by use of the "fiber fuse" method.

FIG. 9 is a microscope photographic picture of a fiber possessing a scattering core formed/produced by use of the "fiber fuse" method (as described herein). The picture clearly shows the fiber with bubbles present in the core region. These bubbles act to scatter light which is traveling in the core.

Figure 10:
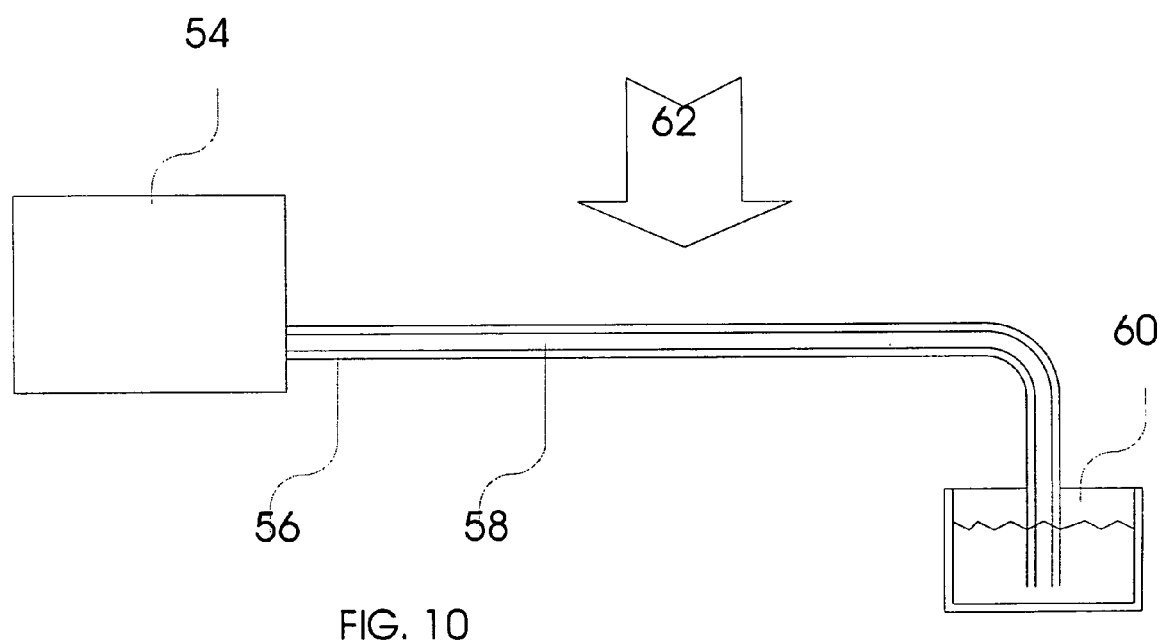
FIG. 10 illustrates a capillary filling process used to manufacture a scattering core.

Reference is now made to FIG. 10 wherein there is shown a capillary filling process used to manufacture a scattering core. A silica capillary 56 (for example, having a 125 micrometer external diameter and a 10 micrometer internal diameter) is connected at one end to a vacuum pump 54. The other end of the capillary 56 is dipped in a liquid container 60. When the vacuum pump 54 is activated, a suction draws the liquid into the capillary 56 to fills its inner volume. The liquid may comprise, for example, Sol-Gel (which is glass in liquid form, at room temperature). This liquid solidifies when heated by heat source 62. When solidifying, the liquid shrinks in volume to create bubbles (whose location is generally indicated at 58) within the internal diameter. The liquid may alternatively comprise a polymer primer. This liquid solidifies in response to a UV radiation source or a heat source (alternatively referenced as 62). In this case, solidification releases adsorbed gases which create bubbles 58 within the internal diameter. The filled capillary 56 may then be used as the scattering core of the optical terminator. As with the fiber fuse method, the included bubbles in the core act to scatter light.

Figure 11:
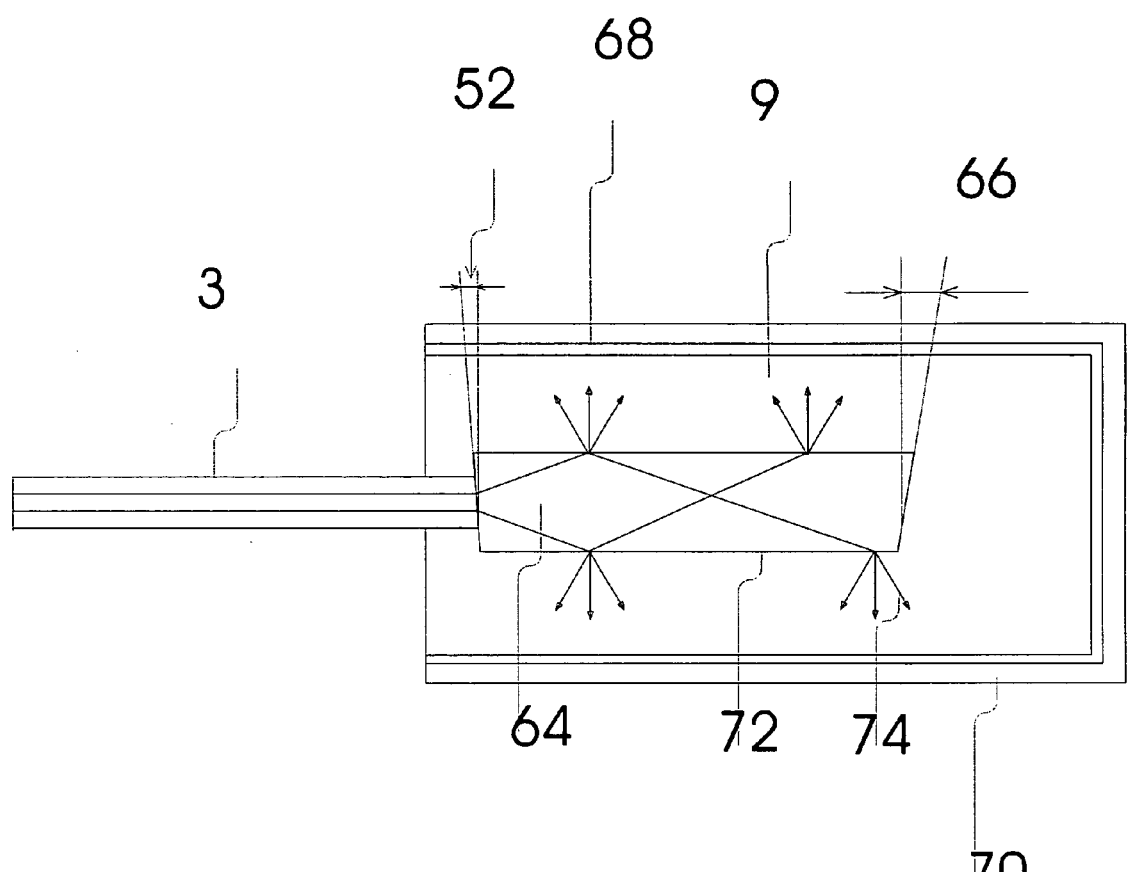
FIG. 11 is a cross-sectional schematic view of an alternate embodiment optical terminator on a fiber.

Reference is now made to FIG. 11 wherein there is shown an alternate embodiment cross-sectional schematic view of an optical terminator on a fiber. The fiber 3 is cut in an angle 52 (for example, of about 4–10 degrees) and is spliced or glued to a transparent volume 64 having a scattering external surface 72. The angle splicing of the fiber 3 allows for a wide selection of materials which are not confined to materials having matching indices of refraction to the that of the fiber 3 core. The light traveling in the core of fiber 3 enters the volume 64, but is not confined therein. The light spreads by refraction to the outer surface 72 of the volume 64 where it is partially scattered 74 at each instance of reflection/refraction with the external surface. A far end of the volume 64 away from attachment to the fiber 3 is cut at an angle 66 (for example, of about 4–10 degrees). The volume 64 can be viewed as an enlarged or extended core of the fiber 3 which possesses dimensions similar to the cladding in diameter and with a length of about 5–10 mm. Scattered light leaving the volume 64, passing through air insulation 9, is absorbed by the absorbing layer 68. As discussed above, this layer 68 absorbs light over a much larger area (between 1,000 and 10,000 times) than that of the core cross-section. Heat from absorption is conducted by convection outwards using the heat sink 70 to the ambient environment. The larger area of the absorbing layer 68 allows for better heat conduction outwards and maintains the thermally insulated core region at temperatures below its damage or melting temperature. The absorbing layer 68 may be made of any suitable material which allows for wide range of wavelengths to be absorbed, and in particular may comprise an optical black paint or epoxy paint.

It is recognized that the external surface of an optical fiber regularly looses light by scattering due to surface irregularities. Etching, mechanical sanding or sand blasting can create the scattering surface on, for example, glass or glass-like materials of the extended core comprising the volume 64. Maintaining a large index of refraction difference (Δn) at the scattering surface enhances the scattering ability of the surface proportionally to (Δn). In the preferred embodiment, Δn is a relatively large value of about 0.5 (the difference between glass and air which surrounds the volume 64).

Reference is now made to FIG. 12 wherein there is shown a graph illustrating the performance of the scattering core terminator, in this case the terminator appearing in FIG. 11, (similar behavior and curves were generated using terminators of FIGS. 1 and 4 as well). at a large spectral band and at high power. The terminator was simulated with a goal of optimizing its dimensions and materials. The tests included experiments where terminators were exposed to CW laser light as well as short pulses. The optimization goals were: minimal back reflection and high power operation. The terminators worked in the same way in both CW and pulsed cases. The achieved results are presented in FIG. 12 which shows broad-spectrum operation with low back reflection of −55 dB at the wavelength spectral range of 1500 to 1600 nm, and high power performance that is not degraded. Endurance tests of terminators over many hours with powers of 33 dBm were conducted without negative result. These results show that the described terminator design can work at high powers of 2 watts of light without compromising its performance due to heating by the light. The low back reflection and the wide absorption band, −55 dB at the wavelength spectral range of 1500 to 1600 nm show the performance.

Figure 13B:
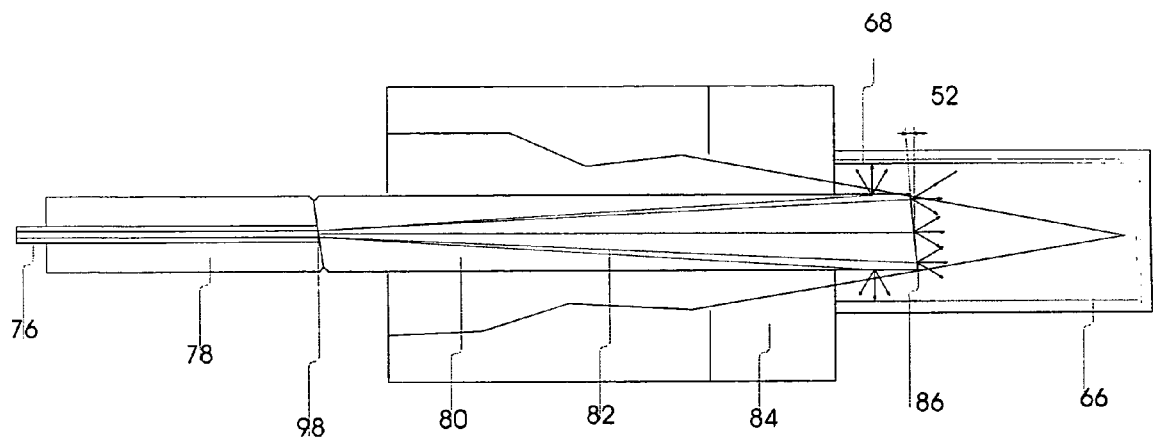
FIGS. 13a and 13b are cross-sectional schematic views of additional optical terminator embodiments.
Figure 13A:
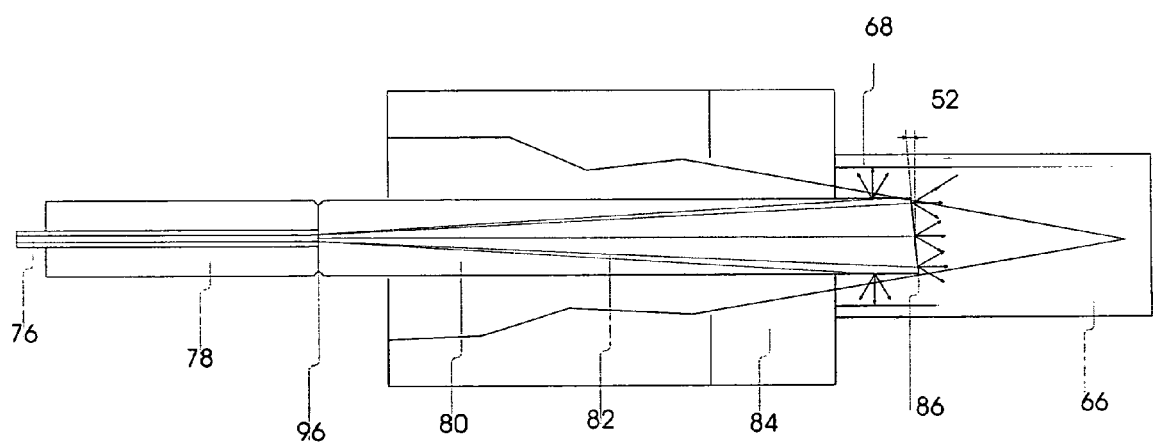

Reference is now made to FIGS. 13a and 13b wherein there are shown cross-sectional schematic views of additional optical terminator embodiments. These embodiments relate to an "input mode independent, enlarged scattering core" type of terminator. In this optical terminator, a ferrule 80 (for example, of a standard diameter of 1.25 or 2.5 mm) serves as an enlarged scattering core. This ferrule 80 may, for example, comprise quartz (or other material which possesses similar optical properties as the feed fiber 76). Light passes through fiber 76 (having its ferrule 78) and impinges into the enlarged scattering core ferrule 80. The feeding fiber 76 can be of any suitable kind (for example, SMF-Single Mode Fiber, HNA-High Numerical Aperture fiber, MM-Multi Mode or PM-Polarization Maintaining). The impinging light is spread by refraction in the enlarged scattering core ferrule 80 until the scattered light reaches the outer surface 86 of the ferrule. This outer surface 86 is naturally scattering or is alternatively treated for providing a scattering surface. At that point, the scattered light impinges on an air gap within an isolation cap 66 having an inside surface which is covered by an absorber area 68 (like the area 10/20 described above). In a preferred embodiment, an end face of the scattering core ferrule 80 is angled 55 (for example, of about 4–10 degrees) in order to avoid mirror like reflections of the scattered light in the ferrule from entering back into the feed fiber 76. In order to minimize back reflection from the interface between the ferrules 78 and 80, the interface 96 therebetween, being normally perpendicular as shown in FIG. 13a can, alternatively, be angled as shown in FIG. 13b (with that angle 98 being from about 4 to 10 degrees).

As shown herein, optical terminator devices can be packaged in at least two ways. A first way uses optical fiber connectors. In this packaging technique, an input fiber leads to the terminator which includes a scattering-absorbing fiber all placed inside a connector like assembly. A second way uses a bare fiber configuration. In this packaging technique, two bare fibers, one that is in its original form and the other that has scattering characteristics (for example, from a "fiber fuse" damaging event, a "filled capillary" process or possessing a "scattering enlarged core") are fusion-spliced or inserted into an aligning sleeve or large diameter capillary and are fixed in position relative to each other. This assembly is then packaged in an outer protective sleeve.

A number of advantages and benefits accrue from use of optical terminator embodiments of the present invention.

The present invention provides a high damage threshold terminator for waveguides or fiber optics which can be used internally in optical systems or at the output port of an optical device or system.

The present invention further provides a terminator for use in a waveguide or optical fiber system, where the fabrication of the terminator can be executed using only optical means or optical laser radiation. This allows for the optical terminator to fabricated inside a waveguide assembly (in situ) after the waveguide and all other components are already manufactured.

The present invention still further provides an optical terminator suitable for use in a waveguide or optical fiber and operable over a broad range of wavelengths.

The present invention additionally provides an optical terminator suitable for use in a waveguide or optical fiber wherein the core or central portion of the terminator scatters light impinging on it and absorption of that scattered light occurs at a heat sink isolated thermally from the fiber core and clad area. This implementation enables high power operation without extreme heating of the optical fiber or waveguide part.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

What is claimed is:

1. An optical terminator for absorbing high power optical energy traveling along a fiber or waveguide, comprising:
   a scattering core that receives the high power optical energy at an end of the scattering core and scatters the high powered optical energy along a length of the scattering core within the optical terminator;
   an absorbing layer at least partially surrounding the scattering core to absorb the high power optical energy scattered by the scattering core; and
   a thermal barrier between the scattering core and the surrounding absorbing layer.

2. The optical terminator of claim 1 further including a heat sink for the absorbing layer.

3. The optical terminator of claim 1 wherein the thermal barrier is an air barrier.

4. The optical terminator of claim 1 wherein the absorbing layer absorbs optical energy of a broad spectrum of wavelengths.

5. The optical terminator of claim 1 as presented in a connector configuration.

6. The optical terminator of claim 1 as presented in a plug configuration.

7. The optical terminator of claim 1 as presented in a bare fiber, in line connection configuration.

8. The optical terminator of claim 1 as presented in a waveguide, in line connection configuration.

9. The optical terminator of claim 1 as presented in an in line configuration with an angled splice connection.

10. The optical terminator of claim 1 wherein the scattering core comprises a fiber fuse-type core.

11. The optical terminator of claim 1 wherein the scattering core comprises a filled capillary-type core.

12. The optical terminator of claim 1 wherein the scattering core comprises an enlarged-type core.

13. The optical terminator of claim 1 as presented in an in line configuration with a tapered splice connection.

14. The optical terminator of claim 1 wherein the scattering core comprises an enlarged-type core having an angled end.

15. The optical terminator of claim 14 as presented in an in line configuration with an angled splice connection to the enlarged-type core.

16. The optical terminator of claim 1 wherein the scattering core comprises an enlarged-type core with a conical shape.

17. The optical terminator of claim 16 wherein the enlarged-type core with the conical shape is an extended fiber.

18. The optical terminator of claim 1 wherein the absorbing layer includes an angled absorbing face.

19. The optical terminator of claim 1 further including an axial distance adjustment mechanism for selectively choosing an axial distance relationship between the scattering core and the absorbing layer.

20. An optical terminator, comprising:
   a heat sink cap having an internal surface;
   an optical absorbing layer on the internal surface of the heat sink cap;
   a fiber having a scattering core and a transparent cladding, the fiber being positioned within the heat sink cap such that a thermal barrier is maintained between the optical absorbing layer and the cladding of the fiber.

21. The optical terminator of claim 20 further including an axial distance adjustment mechanism for selectively choosing an axial distance relationship between the fiber and the optical absorbing layer.

22. The optical terminator of claim 20 wherein the fiber includes a splice for in line connection to another fiber.

23. The optical terminator of claim 22 wherein the splice is an angled splice.

24. The optical terminator of claim 22 wherein the splice is positioned within the heat sink cap.

25. The optical terminator of claim 22 wherein the splice includes a funnel region.

26. The optical terminator of claim 20 wherein the optical absorbing layer on a surface of the heat sink cap adjacent an end of the fiber is angled.

27. The optical terminator of claim 20 wherein the fiber within the heat sink cap has a conical shape.

28. An optical terminator, comprising:
   a heat sink cap having an internal surface;
   an optical energy absorbing layer on the internal surface of the heat sink cap for absorbing optical energy;
   a scattering core for scattering the optical energy;
   a transparent cladding on the scattering core; and
   a thermal barrier positioned between the optical energy absorbing layer and the transparent cladding.

* * * * *